US008851429B2

(12) United States Patent
Rattunde

(10) Patent No.: US 8,851,429 B2
(45) Date of Patent: Oct. 7, 2014

(54) CLAMPING DEVICE FOR ROD-SHAPED PROFILED ELEMENTS

(76) Inventor: Ulrich Rattunde, Bentwisch (DE)

(*) Notice: Subject to any disclaimer, the term of this patent is extended or adjusted under 35 U.S.C. 154(b) by 0 days.

(21) Appl. No.: 13/514,341

(22) PCT Filed: Dec. 8, 2010

(86) PCT No.: PCT/DE2010/001433
§ 371 (c)(1), (2), (4) Date: Jun. 7, 2012

(87) PCT Pub. No.: WO2011/072644
PCT Pub. Date: Jun. 23, 2011

(65) Prior Publication Data

US 2012/0241586 A1 Sep. 27, 2012

(30) Foreign Application Priority Data

Dec. 14, 2009 (DE) ........................ 10 2009 058 036

(51) Int. Cl.
*F16L 3/00* (2006.01)

(52) U.S. Cl.
USPC ........................................... 248/74.1; 248/62

(58) Field of Classification Search
USPC ........ 248/74.2, 71, 316.7, 231.81, 74.1, 74.5, 248/49, 62, 316.1, 316.6; 269/257, 259, 269/264, 265, 266, 271, 274, 275, 277, 152, 269/164, 216, 217, 86, 91, 97, 139, 146
See application file for complete search history.

(56) References Cited

U.S. PATENT DOCUMENTS 4,667,548 A 5/1987 Astle
4,889,298 A * 12/1989 Hauff .............................. 248/56
5,098,047 A * 3/1992 Plumley ....................... 248/68.1
(Continued)

FOREIGN PATENT DOCUMENTS

DE 4012883 1/1991
DE 42 17 860 A1 12/1993
(Continued)

OTHER PUBLICATIONS

PCT International Preliminary Report on Patentability, dated Jul. 4, 2012, issued in corresponding application PCT/DE2010/001433, 7 pages.

(Continued)

*Primary Examiner* — Steven Marsh
(74) *Attorney, Agent, or Firm* — Nash and Titus, LLC

(57) ABSTRACT

The invention relates to a clamping device for rod-shaped profiled elements with a substantially circular cross section and with a central axis (R) of the profiled element which axis runs along a longitudinal direction (L) of the rod-shaped profiled element. The device has at least two centering clamps distanced from each other along a theoretical central axis (S), and has at least two opposing clamping cheeks that can be centrally moved between a clamping position and a release position in a moving plane arranged transversely to the theoretical central axis (S). The cheeks each have a support that jointly surround the rod-shaped profiled element in the clamped position and align the central axis (R) of the profiled elements along the theoretical central axis. The shape of the supports can be changed by an adjustable adjusting device, and the adjusting device reduces an offset of the theoretical central axis (S) from the central axis (R) of the profiled elements in the clamped position.

7 Claims, 5 Drawing Sheets

(56) References Cited

U.S. PATENT DOCUMENTS

| | | | | |
|---|---|---|---|---|
| 5,205,520 | A * | 4/1993 | Walker | 248/74.1 |
| 5,261,633 | A * | 11/1993 | Mastro | 248/74.1 |
| 6,065,744 | A | 5/2000 | Lawrence | |
| 6,561,466 | B1 * | 5/2003 | Myers et al. | 248/74.4 |
| 6,595,473 | B2 * | 7/2003 | Aoki et al. | 248/74.4 |
| 6,782,761 | B2 * | 8/2004 | Imai et al. | 73/861.27 |
| 6,799,607 | B1 * | 10/2004 | Friedline et al. | 138/106 |
| 7,684,055 | B2 | 3/2010 | Rattunde | |
| 8,466,364 | B2 * | 6/2013 | Miura et al. | 174/84 C |

FOREIGN PATENT DOCUMENTS

| | | | |
|---|---|---|---|
| DE | 102006035131 | | 12/2007 |
| JP | 63-68302 | A | 3/1988 |
| JP | 6031564 | A | 2/1994 |
| JP | 2007-168010 | A | 7/2007 |

OTHER PUBLICATIONS

Japanese Search Report, dated Jan. 30, 2014, issued in corresponding application PCT/DE2010/001433, 2 pages.

* cited by examiner

CLAMPING DEVICE FOR ROD-SHAPED PROFILED ELEMENTS

BACKGROUND OF THE INVENTION

This application claims priority from PCT international application PCT/DE2010/001433, filed Dec. 8, 2010, and German application DE 10 2009 058 036.0, filed Dec. 14, 2009, and the entire contents of these applications are incorporated by reference herein.

The invention relates to a clamping device for rod-shaped profiled elements with a substantially circular cross section.

Clamping devices for pipes as a special design of a rod-shaped profiled element are known in the state of the art. The clamping devices comprises two centering clamps at a distance from one another. The two centering clamps surround the pipe in a clamping position in the area of the pipe ends. Pipe ends of the pipe clamped in the clamping position can be supplied to a further working. To this end the pipe ends are, for example, milled, deburred, brushed, etc. A problem of the known clamping devices is the insufficient exactness of the position of the clamped-in pipe. That is, due to many external conditions such as temperature, change of material, etc., the theoretical central axis of the clamping device deviates from the central pipe axis of the clamped-in pipe somewhat as a rule. The deviations can be minimal, i.e., in the micrometer range. Due to quality standards of the industry that does the further processing and imposes on the manufacturer, these standards become more and more strict, and even a slight offset of the central pipe axis of the clamped-in pipe can no longer be accepted because the subsequent working of the pipe ends, for example, by placing bevels, which working is associated with a likewise slight but present deviation, leads to an error when added up, whereby the manufacturer runs the danger of no longer meeting the strict acceptance criteria.

DE 102006 035 131 B3 teaches a machine for introducing markings on the outer surface of a pipe. Here, the relative position of the pipe relative to a marketing tool can be changed with the aid of support plates that can be moved into each other.

U.S. Pat. No. 4,667,548 teaches a working support for the working of pipe end sections. Here, a pipe is clamped in between supports. An adjustment of the pipe end is possible with the aid of a screw rod with which two halves of the working support can be moved against each other; however, a purposeful readjusting of the position of the pipe section in the cross-sectional plane vertical to the longitudinal pipe axis is not rendered possible.

DE 42 17 860 provides a clamping device with the aid of which a pipe machine or milling machine can be attached to the end of a pipe. The clamping device does not make it possible to readjust the set-on milling tool relative to the pipe section.

SUMMARY OF THE INVENTION

Therefore, the invention addresses the above-described problems by making available a clamping device for rod-shaped profiled elements that makes possible a more exact clamping end of the rod-shaped profiled element.

The problem is solved by the clamping devices having the features described below.

The invention makes use of the idea of reducing the offset between the theoretical central axis and the central axis of the profiled element, which offset developed during the clamping in of a rod-shaped profiled element into a clamping device during the course of time or which offset was already there, by means of an adjusting device. The term "rod-shaped profiled element" denotes here, among other things, pipes and solid profiled elements. The clamping device preferably comprises two centering clamps. However, a construction with any higher number of centering clamps is also possible. The profiled elements are formed substantially circularly, preferably exactly circularly, in a cross section transverse to their longitudinal direction. The profiled elements are advantageously substantially, preferably exactly circular in cross section along their entire length. The cross section is advantageously arranged vertically to the longitudinal axis.

The profiled elements rest on supports of the centering clamps. The adjustment takes place by changing the form of the supports.

Each of the centering clamps preferably has two centrally movable clamping cheeks. Each of the centering clamps can have three, four or also any higher number of clamping cheeks.

The centering clamp makes possible the exact moving toward each other and away from each other of the clamping cheeks of opposite clamping cheeks in a plane of moving. It is advantageous it each of the clamping cheeks comprises exactly one support. At least one of the supports is preferably divided into two or any desired higher number of partial supports. The supports are preferably prismatically constructed.

In an advantageous embodiment of the invention each of the clamping cheeks has a prismatically formed support, whereby each of the prismatic supports has two straight support surfaces running in a longitudinal direction of the clamped-in pipe and which stand vertically to one another.

A deviation of the center axis of the clamped-in profiled element from the theoretical center axis in all directions of the moving plane can advantageously be adjusted by the adjustment device. This makes it possible to correct the offset in any desired direction.

The support can be changed in its form in an especially simple manner in an embodiment in which each of the clamping cheeks has at least two slots. The slots of a clamping cheek preferably extend in the longitudinal direction over the entire length of the clamping cheek and thus form a deformable tongue between themselves. The deformable tongue is advantageously designed in such a manner in the clamping cheek that it forms a partial support on the outer wall facing the opposite clamping cheek.

A deforming of the tongue causes the partial support associated with the tongue to be changed in its position relative to the clamping cheek and the support of the clamping cheek formed from at least two partial supports to receive a somewhat different total shape. A profiled element resting in the clamping position on the supports also changes its relative position relative to the clamping cheek a little further. This change is used to reduce the offset.

Each of the clamping cheeks advantageously comprises exactly three slots, an upper one, a lower one and a middle one that form between themselves exactly two adjacently arranged, deformable tongues that are separated from one another by the middle slot. A partial support of the support of a clamping cheek is provided on each of the tongues. Each of the clamping cheeks can be constructed in one piece, in particular the tongues and the associated clamping cheek frame can be in one piece. The clamping cheek can be manufactured in a highly precise manner in the eroding process.

The form of the preferably prismatic support is somewhat changed by the deformation of the preferably two tongues of a clamping cheek. The changes are advantageously performed in such a manner that the opposing and cooperating clamping cheeks of a centering clamp are changed in such a manner that the theoretical central axis and the central axis of the profiled element coincide after the adjusting.

In an especially preferred further development of the invention the adjusting device comprises at least one spacer structural component that can be adjustably changed in a width. The spacer structural component can be inserted into an associated slot and rest on the slot walls or penetrate into them. The slot width can be changed by changing the width of the spacer structural component in the slot. The slot width can also be adjusted by the width of the spacer structural part, that is, the slot width remains in the width adjusted by the spacer structural part for the at least next work step. Then, new adjustments can be subsequently made.

Each of the clamping cheeks has precisely three slots and spacer structural components are let into the second following slot. However, embodiments are also disclosed comprising clamping cheeks with any desired number of slots, in particular four or a higher number of slots. Spacer structural components are preferably let into each of the slots or only into selected slots.

After the profiled element has been clamped into the clamping device a working of the profile of the clamped-in profiled element is preferably performed, during which profiled element ends, for example pipe ends are provided with a bevel. If the central pipe axis does not coincide with the theoretical central axis of the clamping device, the subsequent working of the profiled element ends results in an eccentricity that can be measured by a separate measuring device. The size and position of the measured eccentricity is used to carry out an appropriate subsequent adjusting by means of the adjusting device. For this, it is advantageous to prepare a correlation table in advance that makes it possible to immediately determine an adjustment setting of the adjustment device in accordance with the measured eccentricity that results in an at least distinct reduction of the offset of the two central axes.

In a preferred embodiment of the invention the spacer elements of the adjusting device comprise conical screws with a slight cone angle of less than one degree that are let into a threading set into an associated slot and enlarge or reduce the slot width by being screwed into and out of the threading. Cone angles of less than 0.5 degrees, 0.2 degree or even less are conceivable.

In another embodiment of the adjusting device the spacer structural components are constructed as piezo elements or other, preferably wedge-shaped structural components. Even mixed forms of the spacer structural components are possible, as is the use of different spacer structural components in the same clamping device.

The clamping device in accordance with the invention can be a structural component of a cutting machine for profiled elements. It is preferably provided after a sawing tool in the working process. From the sawing tool the cut-to-length profiled element can be inserted by a gripping arm in the release position of the clamping device and then be clamped in there. The highly precise reworking takes place in the clamped position as described above. The clamping device is then transferred back into the release position and the worked profiled element removed preferably by another gripping arm.

BRIEF DESCRIPTION OF THE FIGURES

The invention is described using an exemplary embodiment in ten figures.

The views are not true to scale and the deformations are greatly exaggerated. The same reference numbers designate the same structural components in the various figures.

DESCRIPTION OF THE PREFERRED EMBODIMENTS

Figure 1:
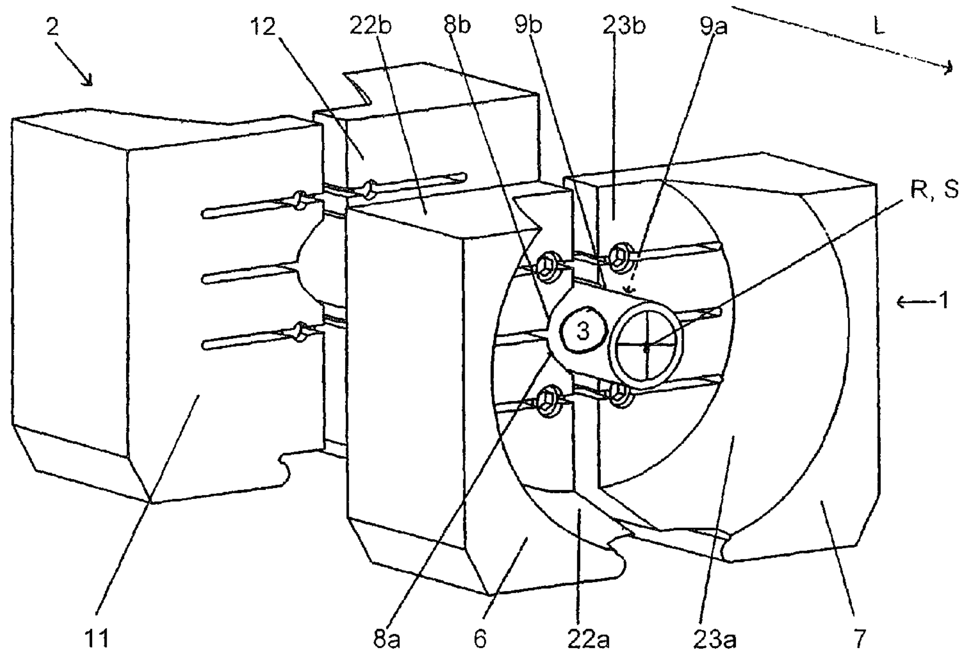
FIG. 1 shows a perspective view of a clamping device in accordance with the invention in the zero position.

FIG. 1 shows the clamping device in accordance with the invention with a front 1 and a rear 2 centering clamp that are at a distance from one another in a longitudinal direction L and between which a pipe 3 is clamped in. The references "front", "rear", "top", "bottom", "left", and "right" refer to the positions of the particular structural components relative to the clamping device as it is shown in the figures. However, all other positions of the clamping device are also disclosed. Each of the two centering clamps 1, 2 has two clamping cheeks 6, 7 that can be moved centrally toward one another. The plane traveled over by the two clamping cheeks 6, 7 of the particular centering clamp 1, 2 forms a moving plane. The two centering clamps 1, 2 are mounted on a moving device (not shown) that is preferably operated by compressed air as a control medium. Each front clamping cheek 6, 7 has a prismatic support. The front 1 and the rear centering clamp have the identical construction.

The pipe 3 shown in FIG. 1 has a central pipe axis R and the two centering clamps 1, 2 have a theoretical central axis 8 that runs centrally through the two centering clamps 1, 2. The pipe 3 is clamped into the two centering clamps 1, 2. The clamping device is therefore in a clamped position.

Pipe ends of the pipe 3 clamped in the two centering clamps 1,2 stand out somewhat beyond the clamping cheeks 6, 7, 11, 12 of the centering clamps 1, 2. The free pipe ends can therefore be subjected in the clamped position to a working in the form of brushing, deburring and/or beveling by means of a tool head (not shown). The tool head is guided for working from the outside to the free pipe end, brought into a working position and it executes a rotary movement about the theoretical central axis S during the working.

Figure 2:
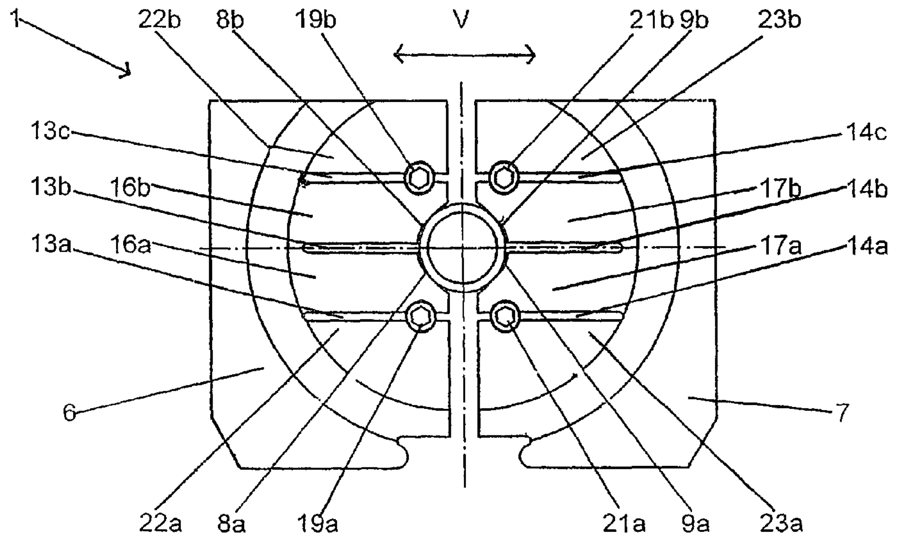
FIG. 2 shows a front view in FIG. 1.

FIG. 2 shows a top view onto the pipe 3 in the clamped position. The front centering clamp 1 shown in FIG. 2 comprises the left and right front clamping cheeks 6, 7 that cooperate to clamp in the pipe 3. The clamping cheeks 6, 7 can move centrally onto one another in order to firmly clamp the pipe 3 in the clamped position in order to then be subjected to a working and be moved centrally away from one another in order to release the pipe 3 in a release position which pipe can then be removed from the clamping device by a gripping arm (not shown).

The central pipe axis R and the theoretical central axis S of the clamping device coincide in FIG. 1 and FIG. 2. The subsequent working of the pipe ends is aligned by the tool head on the theoretical central axis S. An offset between the central pipe axis R and the theoretical central axis S thus results in an eccentricity in the working of the pipe end. FIG. 2 shows the zero position where no offset is present.

As a result of diverse influences such as temperature fluctuations, material changes in the course of time and many other influencing factors, the clamping device does not always clamp even the ideal circular pipe 3 in the zero position without offset according to FIG. 2.

An offset can occur between the central pipe axis R and the theoretical central axis S. The offset results from an eccentricity of the working, that is, for example, from circumferentially different beveling depths of the pipe end in the subsequent working step.

Both centering clamps 1, 2 comprise exactly 2 clamping cheeks 6, 7, 11, 12. The clamping cheeks 6, 7, 11, 12 can move in the moving plane associated with the particular centering clamp 1, 2. The moving plane is arranged vertically to the theoretical central axis S. The two moving planes of the centering clamps 1, 2 run parallel to one another.

The two clamping cheeks 6, 7, 11, 12 of each centering clamp 1, 2 each have three slots 13*a*, 13*b*, 13*c*, 14*a*, 14*b*, 14*c*. The two upper slots 13*c*, 14*c* and the two bottom slots 13*a*, 14*a* are designed equally long and somewhat longer than the two central slots 13*b*, 14*b* in FIG. 2. The three slots 13*a*, 13*b*, 13*c*, 14*a*, 14*b*, 14*c* of each clamping cheek 6, 7 run from the wall of the clamping cheek 6, 7, which wall faces the particular clamping cheek 6, 7 located opposite in the moving plane, in a straight line into the particular clamping cheek 6, 7, 11, 12. The opposing slots 13*a*, 13*b*, 13*c*, 14*a*, 14*b*, 14*c* of the two opposing clamping cheeks 6, 7 are arranged at the same vertical height and in a straight prolongation to each other. The three slots 13*a*, 13*b*, 13*c*, 14*a*, 14*b*, 14*c* of a clamping cheek 6, 7 form two deformable tongues 16*a*, 16*b*, 17*a*, 17*b*.

Each of the clamping cheeks 6, 7 has two prismatic support parts 8*a*, 8*b*, 9*a*, 9*b*. A prismatic support is distinguished in that it has two straight support surfaces arranged at a right angle to one another and that are curved into one another. Two opposing and cooperating prismatic supports allow pipes 3 with different diameters to be held firmly clamped in the clamped position, whereby the pipe 3 rests on the two prismatic supports in each centering clamp 1, 2 along four support lines. Each of the prismatic supports forms two support lines. According to the invention each of the prismatic supports is separated by a central slot 13*b*, 14*b* into an upper and a lower support part 8*a*, 8*b*, 9*a*, 9*b*.

The upper left support part 8*b* is arranged on the upper left tongue 16 and the left lower support part 8*a* is arranged on the bottom left tongue 16. As a consequence of the movability of the tongues 16*a*, 16*b* and of the associated mutual ability of the partial supports 8*a*, 8*b*, 9*a*, 9*b* to shift against each other, the two prismatic supports can on the whole be somewhat deformed, as a result of which the position of the clamped-in pipe 3 in the clamped position can be changed. The changing makes it possible to readjust an offset of the central pipe axis R from the theoretical central axis S which offset developed on account of the above-cited influences. Thus, an offset of the axes that is being produced can be reduced and corrected. Support parts are provided on the other tongues in a corresponding manner.

The adjusting device comprises in this embodiment four conical screws 19*a*, 19*b*, 21*a*, 21*b* per centering clamp 1, 2. The conical screws 19*a*, 19*b*, 21*a*, 21*b* are screwed on the end of the upper and lower slot 13*a*, 13*c*, 14*a*, 14*c* which end faces the pipe 3, into a threaded bore running in the associated slot 13*a*, 13*c*, 14*a*, 14*c* in longitudinal direction L. In the zero position shown in FIG. 1 the slot widths of the upper 13*c*, 14*c* and bottom slots 13*a*, 14*a* are all the same. By screwing in the conical screw 19*a*, 19*b*, 21*a*, 21*b* the particular slot width can be enlarged and by screwing out the particular conical screw 19*a*, 19*b*, 21 a, 21 b the associated slot width can be reduced. The four tongues 16*a*, 16*b*, 17*a*, 17*b* are shaped in such a manner that they have a pre-tension relative to an upper and lower clamping cheek frame 22*a*, 22*b*, 23*a*, 23*b* adjacent to them. The upper and lower clamping cheek frames 22*a*, 22*b*, 23*a*, 23*b* are distinctly more difficult to deform than the four tongues 16*a*, 16*b*, 17*a*, 17*b* because the upper and lower clamping cheek frame 22*a*, 22*b*, 23*a*, 23*b* is distinctly thickened in an area facing away from the pipe 3 and is designed higher even in the vertical direction than the four tongues 16*a*, 16*b*, 17*a*, 17*b*. The four tongues 16*a*, 16*b*, 17*a*, 17*b* of a centering clamp 1 all have the same length in longitudinal direction L, height in vertical direction H and depth in moving direction V.

Figure 3:
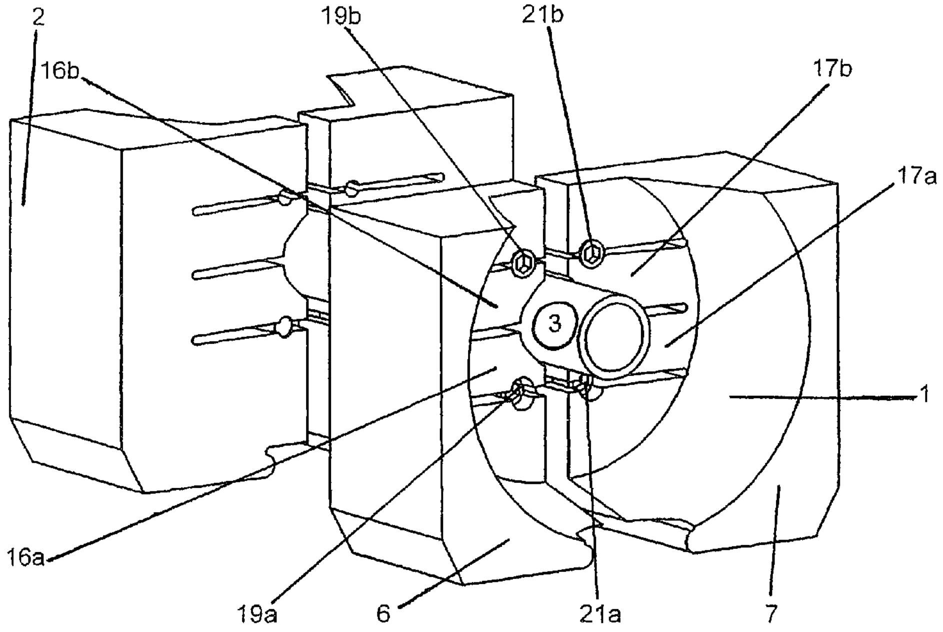
FIG. 3 shows a perspective view of the clamping device in FIG. 1 with screwed-out upper conical screws and screwed-in lower conical screws.

FIG. 3 shows the clamping device in FIG. 1 in a readjusted position. The upper left 19*b* and the upper right conical screw 21*b* are screwed out so that the upper left 16*b* and the upper right tongue 17*b* of the front centering clamp 1 are upwardly deformed by their pre-tensioning whereas the two lower conical screws 19*a*, 21*a* of the left and right clamping cheek 6, 7 of the front centering clamp 1 are screwed in and the associated two lower tongues 16*a*, 17*a* therefore upwardly deform. As a result, the two left 8*a*, 8*b* and right prismatic support parts 9*a*, 9*b* are shifted in such a manner that the clamped-in pipe 3 shifts a bit further upward in the clamped position.

Figure 4:
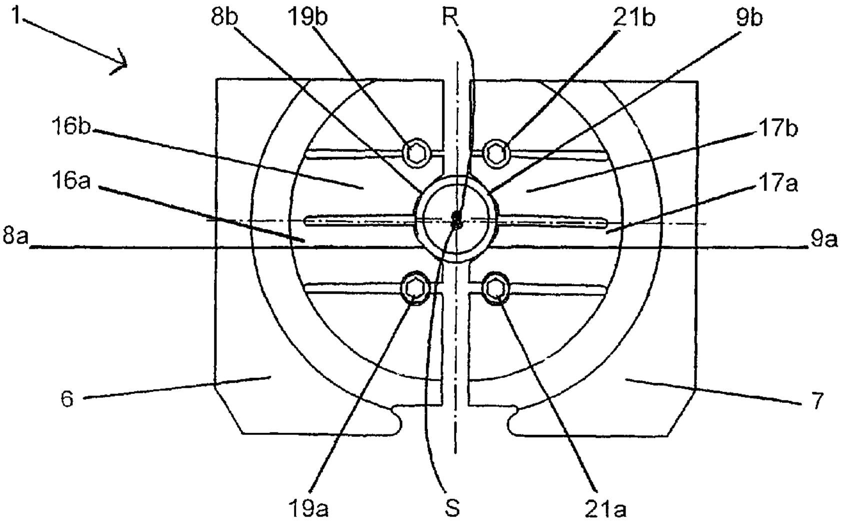
FIG. 4 shows a front view in FIG. 3.

FIG. 4 shows the shifting of the central pipe axis R relative to the theoretical central axis S by one offset vertically upward.

Figure 5:
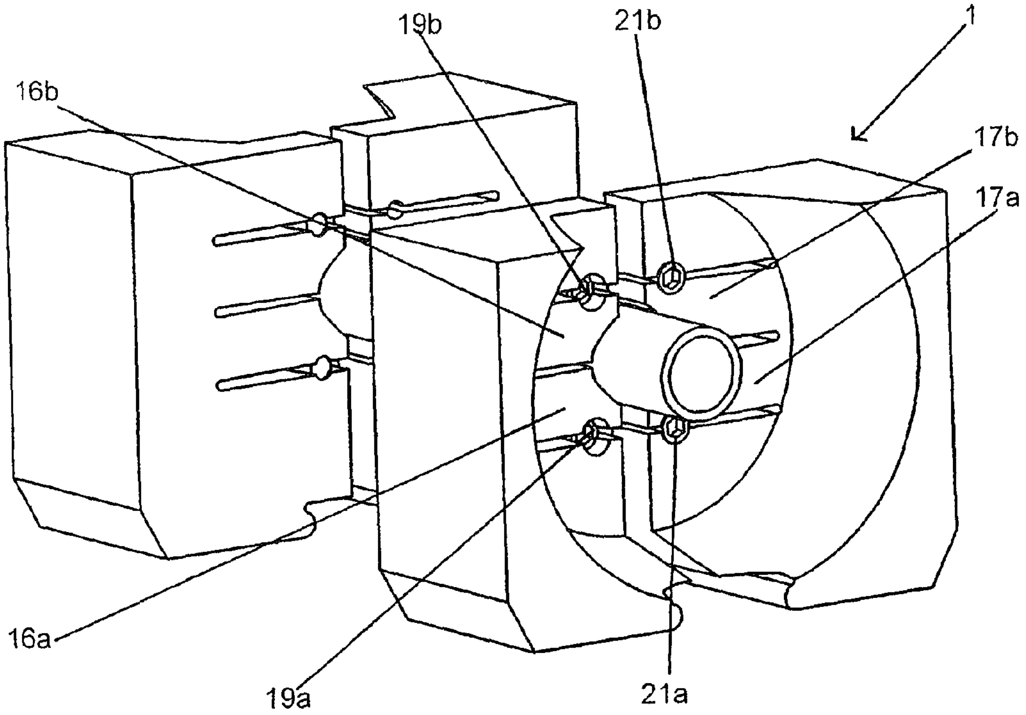
FIG. 5 shows a clamping device in FIG. 1 with screwed-out right conical screws and screwed-in left conical screws.

FIG. 5 shows a perspective view of the centering clamp 1 in FIG. 1 with screwed-out right upper 21*b* and right lower conical screw 21*a* and screwed-in left upper 19*b* and left lower conical screw 19*a*.

Figure 6:
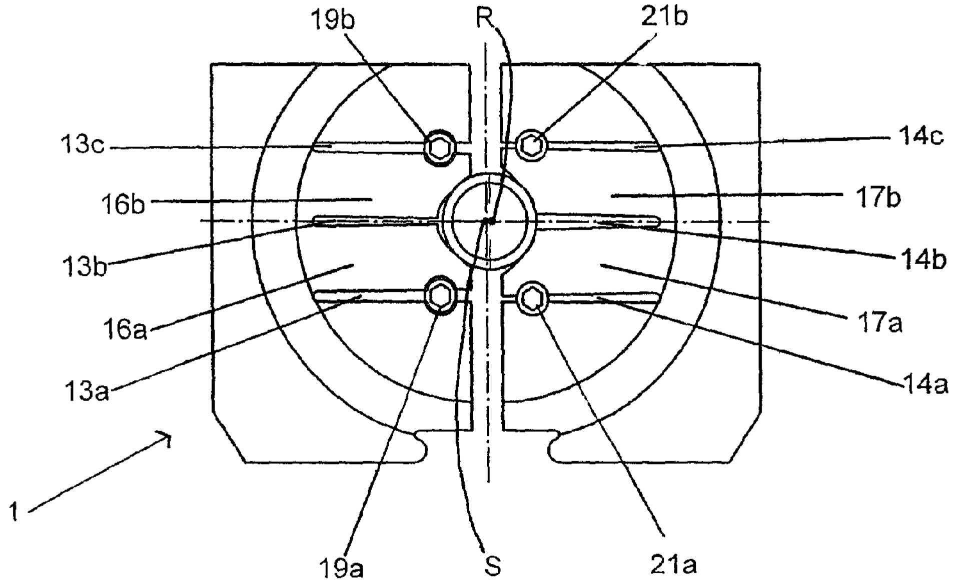
FIG. 6 shows a front view in FIG. 5.

FIG. 6 shows the deformation of the four tongues 16*a*, 16*b*, 17*a*, 17*b* in a corresponding manner. As a result of the pre-tensioning and the screwing out of the right upper screw 21*b* the right upper tongue 17*b* is upwardly deformed. In a corresponding manner the right bottom tongue 17*a* is downwardly deformed by screwing out the right lower conical screw 21 a and therefore the right prismatic support is widened out somewhat and the clamped-in pipe 3 is moved a bit further to the right. The right upper 14*c* and lower slot 14*a* become constricted and the right central slot 14*b* widens.

In the same adjustment in FIG. 6 the left upper conical screw 19*b* and the left lower conical screw 19*a* are screwed in so that the two left tongues 16*a*, 16*b* are deformed centrally toward one another, the left center slot 13*b* constricts, the left upper and left lower slot 13*c*, 13*a* widen out and the left prismatic support is also somewhat constricted.

Basically, the adjustment device should be adjusted with its four conical screws 19*a*, 19*b*, 21*a*, 21*b* in such a manner that an adjustment takes place not exclusively by a screwing in or out but rather simultaneously via an associated screwing in and out of corresponding conical screws. FIG. 6 shows an offset of the central pipe axis R from the theoretical central axis S to the right in the position.

Figure 7:
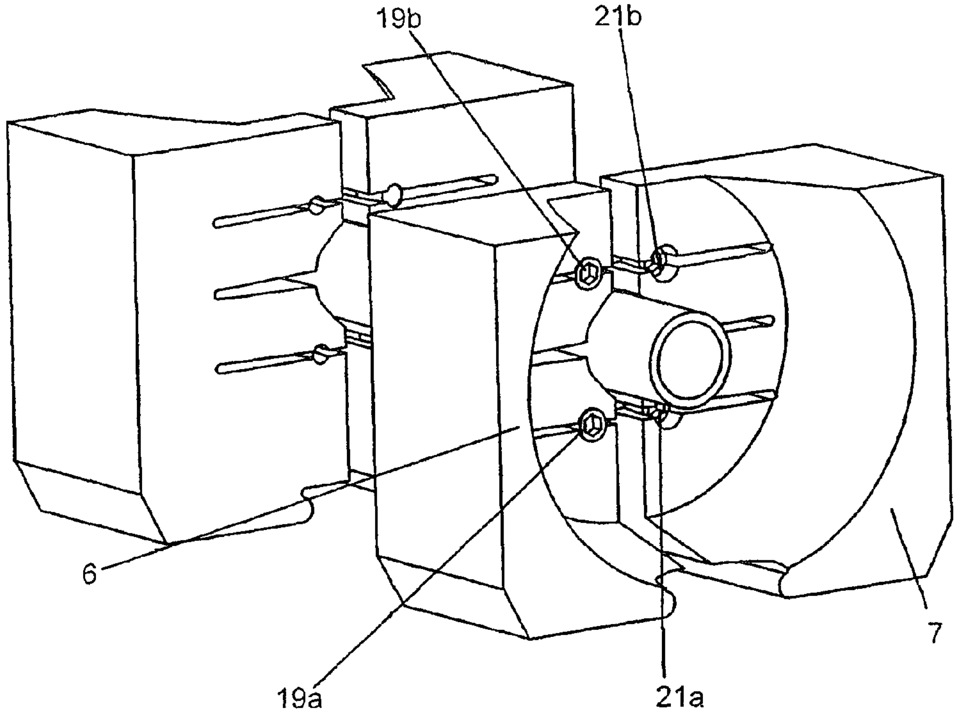
FIG. 7 shows a clamping device in FIG. 1 with screwed-out lower conical screws and screwed-in upper conical screws.
Figure 8:
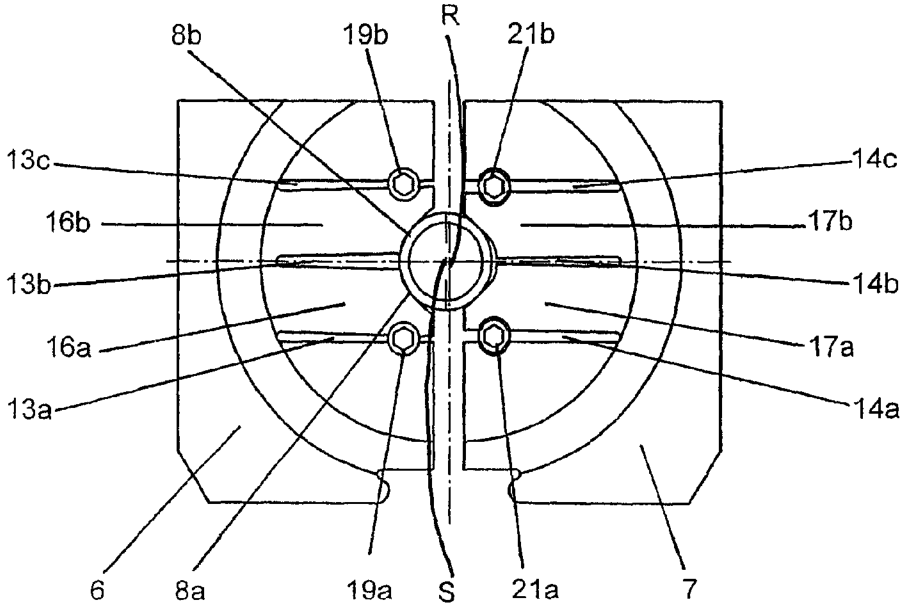
FIG. 8 shows a front view in FIG. 7.

FIG. 7 shows the clamping device with screwed-out left conical screws 19*a*, 19*b* and screwed-in right conical screws 21*a*, 21*b*, so that, as is shown in FIG. 8, the left upper 13*c* and lower slots 13*a* are constricted and the left upper tongue 16*b* is deformed upward and the left lower tongue 16*a* is deformed downward. The left support parts 8*a*, 8*b* are distanced further from one another. On the right clamping cheek the conical screws 21*a*, 21*b* are both screwed out and the two tongues 17*a*, 17*b* deform toward one another. The pipe 3 is moved to the left.

Figure 9:
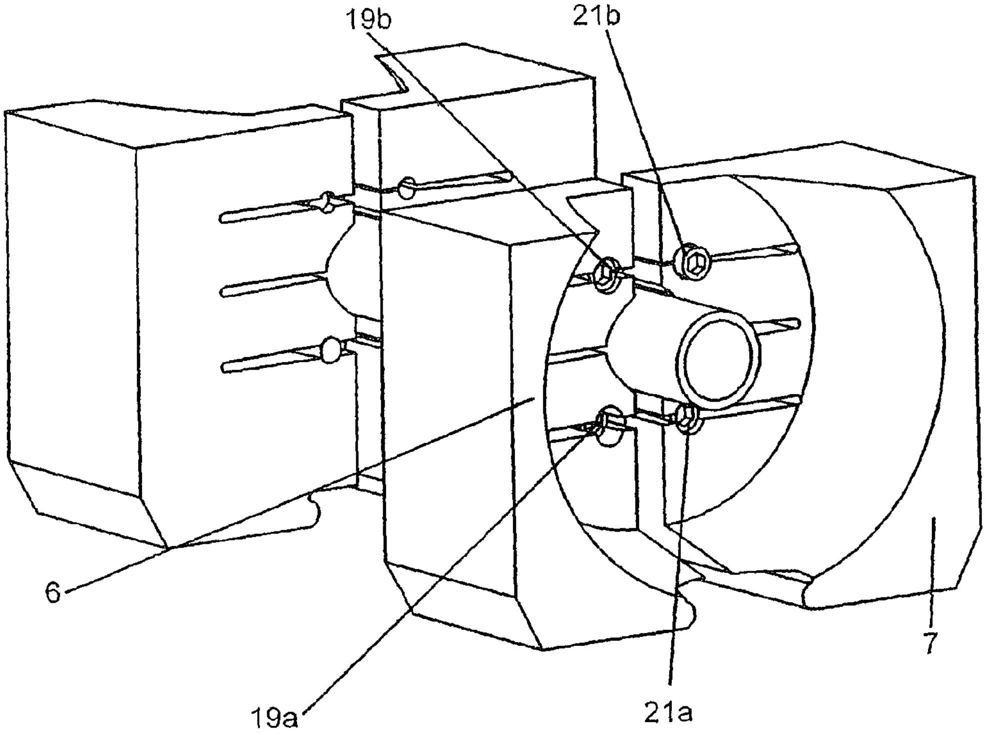
FIG. 9 shows a clamping device in FIG. 1 with screwed-out upper right conical screw and screwed-in lower left conical screw.
Figure 10:
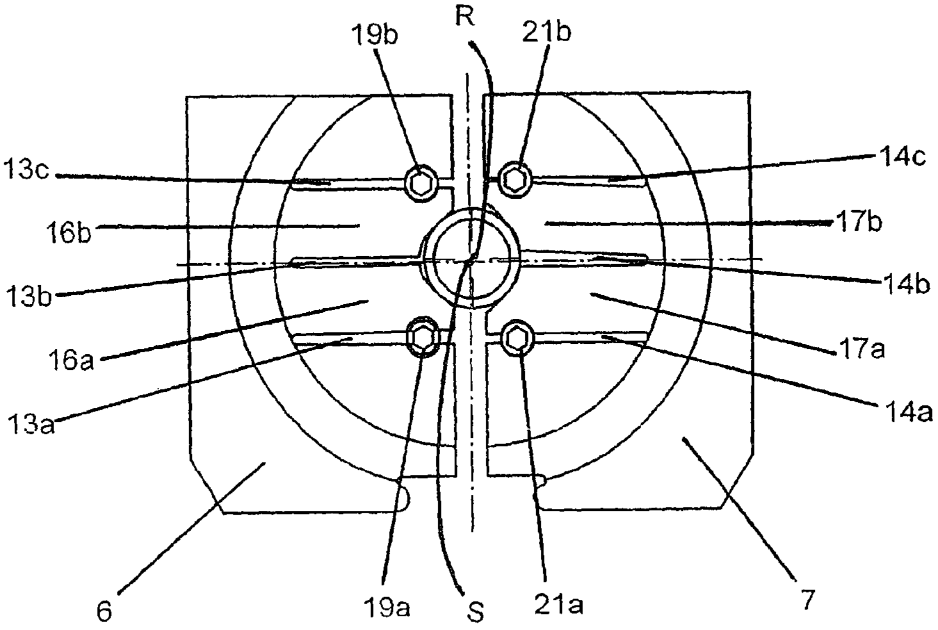
FIG. 10 shows a front view in FIG. 9.

FIG. 9 and FIG. 10 show the clamping device with diagonally actuated conical screws 19*a*, 21*b*, the upper right conical screw 21*b* is screwed out while the upper left conical screw 19*a* is screwed in. As a result, the upper left tongue 16*a* is deformed upward while the upper right tongue 17*b* is also deformed upward. As a result of the changing of the two prismatic supports, the clamped-in pipe moves a bit further to the right and upward in the clamped position.

The settings of the adjustment device shown in FIGS. 3 to 10 clarify the offset relative to the zero position in accordance with FIG. 1. In the real application of the adjustment device the adjustment is carried out in the inverse manner in that in the position according to FIG. 1, in which no adjustment was made, a sample working of the pipe ends is carried out and then both ends of the pipe 3 are measured in a very precise manner. An eccentricity which is measured is taken as the basis for the readjustment so that the offset between the central pipe axis R and the theoretical axis S is reduced in accordance with the adjustment of the conical screws 19*a*, 19*b*, 21*a*, 21*b* and is cancelled to the extent possible. To this end a correlation table is prepared in the run-up that makes it possible, using the measured eccentricity of the working of one end of a pipe, to indicate turning depths of the individual conical screws 19*a*, 19*b*, 21*a*, 21*b* in order to eliminate the eccentricity as completely as possible.

LIST OF REFERENCE NUMERALS

1 centering clamp
2 centering clamp
3 pipe
6 clamping cheek
7 clamping cheek
8*a* prismatic support parts
8*b* prismatic support parts
9*a* prismatic support parts
9*b* prismatic support parts
11 clamping cheek
12 clamping cheek
13*a* slot
13*b* slot
13*c* slot
14*a* slot
14*b* slot
14*c* slot
16*a* tongue
16*b* tongue
17*a* tongue
17*b* tongue
19*a* conical screw
19*b* conical screw
21*a* conical screw
21*b* conical screw
22*a* clamping cheek frame
22*b* clamping cheek frame
23*a* clamping cheek frame
23*b* clamping cheek frame
H height in vertical direction
L longitudinal direction
R central pipe axis
S theoretical central axis
V direction of movement

The invention claimed is:

1. A clamping device for rod-shaped profiled elements having a substantially circular cross section and having a central axis (R) of the profiled element which axis runs along a longitudinal direction (L) of the rod-shaped profiled element, and having at least two centering clamps distanced from each other along a theoretical central axis (S), and having at least two opposing clamping cheeks that are centrally movable between a clamping position and a release position in a moving plane arranged transversely to the theoretical central axis (S), which cheeks each have a support that jointly surround the rod-shaped profiled element in the clamped position and align the central axis (R) of the profiled elements along the theoretical central axis, wherein the shape of the supports can be changed by an adjustable adjusting device which reduces an offset of the theoretical central axis (S) from the central axis (R) of the profiled elements in the clamped position, and wherein each of the clamping cheeks has at least two adjacently arranged slots that extend in a longitudinal direction (L) of the clamped-in, rod-shaped profiled element over the entire length of the clamping cheeks and form at least one deformable tongue between themselves on which tongue a partial support is formed.

2. The clamping device according to claim 1, wherein an offset of the central axis (R) of the profiled element of the clamped-in profiled element is adjustable in all directions in the moving plane by means of the adjusting device.

3. The clamping device according to claim 1, wherein each of the clamping cheeks has three slots and at least two adjacently arranged tongues that are separated from each other by a slot and have a partial support.

4. The clamping device according to claim 1, having at least two deformable tongues of a centering clamp that are adjustable by the adjusting device in a manner coordinated with each other.

5. The clamping device according to claim 1, wherein the adjusting device comprises at least one spacer structural component that can be adjustably changed in width and that is insertable in an associated slot so as to rest on slot walls.

6. The clamping device according to claim 5, wherein each of the clamping cheeks has at least three slots, and wherein the at least one spacer structural component is let into a second following slot.

7. The clamping device according to claim 1, wherein at least one of the supports is constructed as a prismatic support.

* * * * *